(12) United States Patent
Arai et al.

(10) Patent No.: US 8,489,305 B2
(45) Date of Patent: Jul. 16, 2013

(54) CAR-FOLLOWING CONTROLLER AND CAR-FOLLOWING CONTROL METHOD

(75) Inventors: Toshiaki Arai, Wako (JP); Hiroshi Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 69 days.

(21) Appl. No.: 13/260,006

(22) PCT Filed: Apr. 14, 2010

(86) PCT No.: PCT/JP2010/056662
§ 371 (c)(1),
(2), (4) Date: Oct. 26, 2011

(87) PCT Pub. No.: WO2010/131542
PCT Pub. Date: Nov. 18, 2010

(65) Prior Publication Data
US 2012/0053808 A1 Mar. 1, 2012

(30) Foreign Application Priority Data
May 12, 2009 (JP) .................................. 2009-115224

(51) Int. Cl.
*B60K 31/00* (2006.01)
(52) U.S. Cl.
USPC ............................................ 701/96; 180/170
(58) Field of Classification Search
USPC .................................. 701/93, 96; 180/167–171
See application file for complete search history.

(56) References Cited

U.S. PATENT DOCUMENTS

| 5,091,726 A | * | 2/1992 | Shyu ................................ 701/96 |
| 5,680,122 A | * | 10/1997 | Mio ................................ 340/932 |
| 6,032,097 A | * | 2/2000 | Iihoshi et al. .................... 701/96 |
| 2010/0256836 A1 | * | 10/2010 | Mudalige ........................... 701/2 |
| 2013/0041567 A1 | * | 2/2013 | Yamashiro ....................... 701/96 |

FOREIGN PATENT DOCUMENTS

| JP | 10-147160 A | 6/1998 |
| JP | 2002-104016 A | 4/2002 |
| JP | 2007-69727 A | 3/2007 |
| JP | 2007-69729 A | 3/2007 |

* cited by examiner

*Primary Examiner* — Yonel Beaulieu
(74) *Attorney, Agent, or Firm* — Arent Fox LLP

(57) ABSTRACT

When a preceding vehicle (Vb) starts during deceleration of a vehicle (Va) which is trying to stop following the stopped preceding vehicle (Vb), if the vehicle (Va) accelerates following the preceding vehicle (Vb), the driver possibly mistakes that the vehicle is equipped with an automatic start function. A virtual preceding vehicle (Vb') is set at the stop position of the preceding vehicle (Vb), so that the vehicle (Va) is temporarily stopped following the stopping virtual preceding vehicle (Vb') even if the actual preceding vehicle (Vb) is started. As a result, the vehicle (Va) is not started until the driver indicates the intention to start by operating a start switch, and the driver can be prevented from mistaking that the vehicle is equipped with an automatic start function.

8 Claims, 5 Drawing Sheets

FIG.2

(A) PRECEDING VEHICLE STOPS AND SUBJECT VEHICLE ALSO DECELERATES

AT THIS POINT A VIRTUAL PRECEDING VEHICLE IS PLACED AT THE POSITION OF THE PRECEDING VEHICLE

SUBJECT VEHICLE Va
V > 0 [km/h]

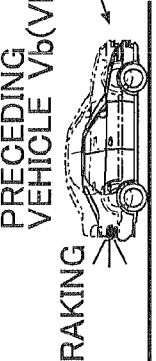
PRECEDING VEHICLE Vb(Vb')
BRAKING
V = 0 [km/h]

(B) STOP CONTROL IS CONTINUED WITH RESPECT TO THE VIRTUAL PRECEDING VEHICLE EVEN IF THE PRECEDING VEHICLE STARTS JUST BEFORE THE SUBJECT VEHICLE STOPS

SUBJECT VEHICLE Va
BRAKING
V = 0 [km/h]

VIRTUAL PRECEDING VEHICLE Vb'
V = 0 [km/h]

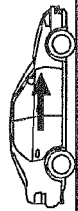
PRECEDING VEHICLE Vb
V > 0 [km/h]

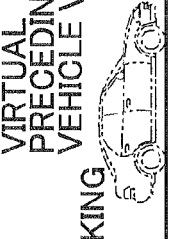

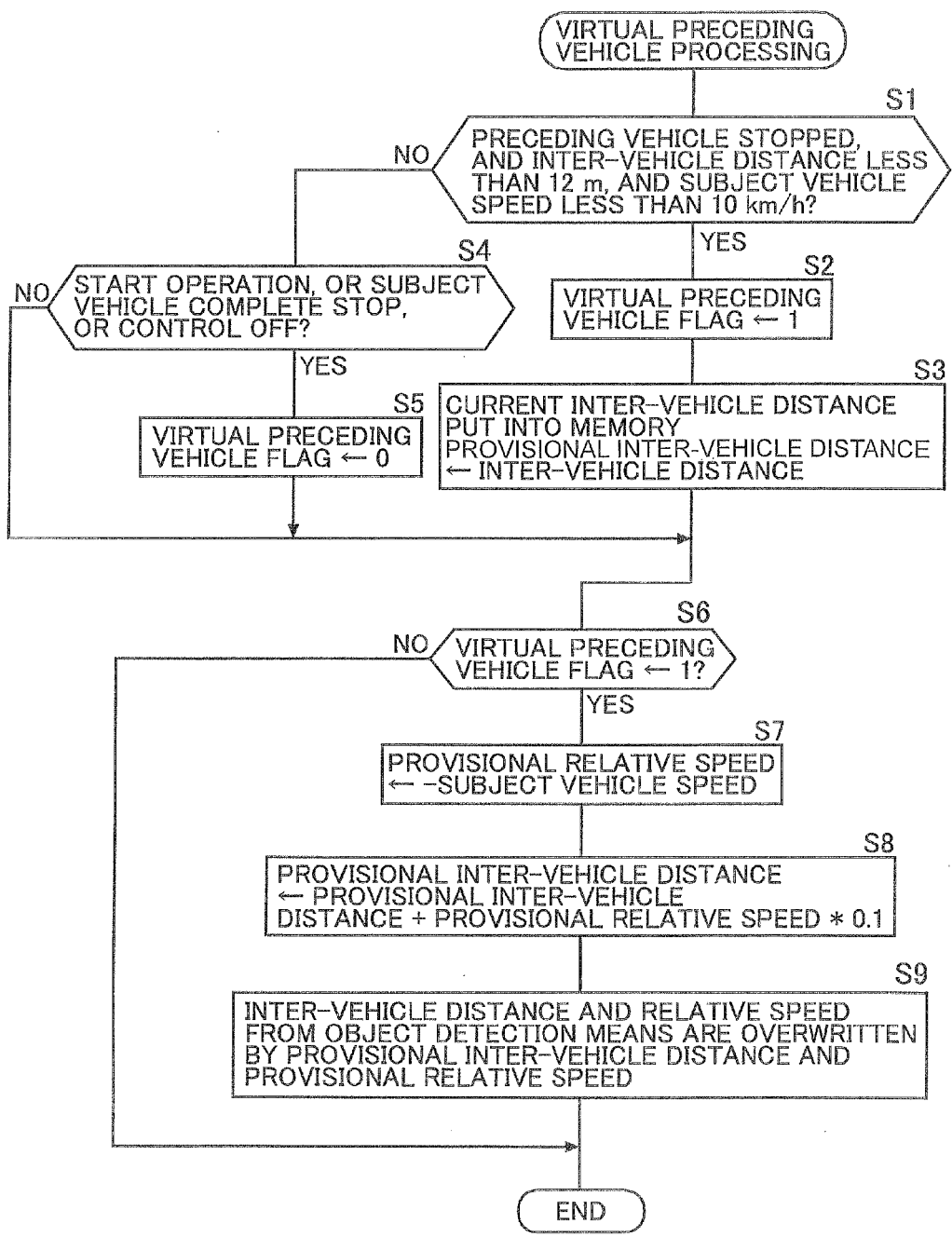

CAR-FOLLOWING CONTROLLER AND CAR-FOLLOWING CONTROL METHOD

CROSS-REFERENCE TO RELATED APPLICATION

This Application is a National Stage entry of International Application No. PCT/JP2010/056662, having an international filing date of Apr. 14, 2010; which claims priority to Japanese Application No. 2009-115224, filed May 12, 2009, the disclosure of each of which is hereby incorporated in its entirety by reference.

TECHNICAL FIELD

The present invention relates to a car-following controller that includes object detection means for detecting an object in the direction of travel of a subject vehicle, vehicle speed detection means for detecting a vehicle speed of the subject vehicle, control start command means for commanding starting of following control, preceding vehicle determination means for determining the state of travel, among objects detected by the object detection means, of a preceding vehicle that the subject vehicle is following, and following control means for carrying out acceleration/deceleration control and stop hold control of the subject vehicle based on the vehicle speed of the subject vehicle and the inter-vehicle distance with respect to the preceding vehicle when starting of following control is commanded by the control start command means.

Furthermore, the present invention relates to a car-following control method in which the state of travel of a preceding vehicle that a subject vehicle is following is determined from information about an object in the direction of travel of the subject vehicle detected by object detection means and acceleration/deceleration control and stop hold control of the subject vehicle are carried out, based on the vehicle speed of the subject vehicle and the inter-vehicle distance with respect to the preceding vehicle, when starting of following control is commanded.

BACKGROUND ART

With regard to a car-following controller that makes a subject vehicle follow a preceding vehicle that repeatedly stops and starts, while maintaining a constant inter-vehicle distance, so as to alleviate the burden of operation on a driver when there is congestion, etc., there is an arrangement known from Patent Document 1 below in which, for the purpose of dealing with a case in which it would be dangerous if the subject vehicle automatically started while following a preceding vehicle at an intersection, level crossing, etc., starting of the subject vehicle is prohibited unless the driver operates a start switch or depresses an accelerator pedal even when starting of the preceding vehicle is detected.
Patent Document 1: Japanese Patent Application Laid-open No. 10-147160

DISCLOSURE OF INVENTION

Problems to be Solved by the Invention

In the above-mentioned conventional arrangement, starting of a subject vehicle is prohibited unless the driver operates a start switch or depresses an accelerator pedal, but the driver might mistakenly think that the subject vehicle has a function of automatically starting without requiring the operation of a start switch or depression of an accelerator pedal under the situation below.

FIG. 4 shows the operation of a conventional car-following controller in a normal situation; in FIG. 4 (A) when a preceding vehicle Vb decelerates and stops a subject vehicle Va follows and decelerates, and in the subsequent FIG. 4 (B) the subject vehicle Va stops just before the stopped preceding vehicle Vb. In FIG. 4 (C), the subject vehicle Va maintains the stopped state without starting until the driver operates a start switch or depresses an accelerator pedal. In this case, the driver does not mistakenly think that the subject vehicle Va has the function of automatically starting.

FIG. 5 shows the operation of the conventional car-following controller in a specific situation; in FIG. 5 (A), when the preceding vehicle Vb decelerates and stops the subject vehicle Va follows and decelerates. If the preceding vehicle Vb has started before the subject vehicle Va has stopped as in the subsequent FIG. 5 (B), in FIG. 5 (C) during deceleration the subject vehicle Va without stopping accelerates while following the preceding vehicle Vb. During this process, since the driver does not carry out operation of a start switch or depression of an accelerator pedal, the driver might mistakenly think that the subject vehicle Va has the function of automatically starting.

The present invention has been accomplished under the above-mentioned circumstances, and it is an object thereof to prevent a driver from mistakenly thinking that, with regard to a car-following controller, a subject vehicle has a function of automatically starting while following starting of a preceding vehicle.

Means for Solving the Problems

In order to attain the above object, according to a first aspect of the present invention, there is provided a car-following controller comprising object detection means for detecting an object in the direction of travel of a subject vehicle, vehicle speed detection means for detecting a vehicle speed of the subject vehicle, control start command means for commanding the starting of following control, preceding vehicle determination means for determining the state of travel, among objects detected by the object detection means, of a preceding vehicle that the subject vehicle is following, and following control means for carrying out acceleration/deceleration control and stop hold control of the subject vehicle based on the vehicle speed of the subject vehicle and the inter-vehicle distance with respect to the preceding vehicle when starting of following control is commanded by the control start command means, characterized in that the following control means determines that stop determination conditions for the subject vehicle are fulfilled if the preceding vehicle determination means detects stopping of the preceding vehicle and, after the stop determination conditions are fulfilled, carries out temporary stop hold control after the subject vehicle is subjected to deceleration control regardless of whether or not the preceding vehicle has started.

Further, according to a second aspect of the present invention, in addition to the first aspect, the following control means determines that stop determination conditions for the subject vehicle are fulfilled if, when the preceding vehicle determination means detects stopping of the preceding vehicle, the inter-vehicle distance with respect to the preceding vehicle is less than a predetermined value and the vehicle speed of the subject vehicle is less than a predetermined value.

Furthermore, according to a third aspect of the present invention, in addition to the first or second aspect of the present invention, if stop determination conditions for the subject vehicle are fulfilled, the following control means sets a virtual preceding vehicle at the stop position of the preceding vehicle and carries out deceleration control and stop hold control with respect to the virtual preceding vehicle.

Moreover, according to a fourth aspect of the present invention, in addition to the third aspect, the following control means releases the setting of the virtual preceding vehicle after stop hold control with respect to the virtual preceding vehicle is executed.

Further, according to a fifth aspect of the present invention, there is provided a car-following control method in which the state of travel of a preceding vehicle that a subject vehicle is following is determined from information about an object, in the direction of travel of the subject vehicle, detected by object detection means, and acceleration/deceleration control and stop hold control of the subject vehicle are carried out based on a vehicle speed of the subject vehicle and an inter-vehicle distance with respect to the preceding vehicle when the starting of following control is commanded, characterized in that the method comprises a first step of determining that stop determination conditions for the subject vehicle are fulfilled if stopping of the preceding vehicle is detected, and a second step of, after the stop determination conditions are fulfilled, carrying out temporary stop hold control after the subject vehicle is subjected to deceleration control regardless of whether or not the preceding vehicle has started.

Furthermore, according to a sixth aspect of the present invention, in addition to the fifth aspect, it is determined that stop determination conditions for the subject vehicle are fulfilled if in the first step the inter-vehicle distance with respect to the preceding vehicle when the preceding vehicle has stopped is less than a predetermined value and the vehicle speed of the subject vehicle is less than a predetermined value.

Moreover, according to a seventh aspect of the present invention, in addition to the fifth or sixth aspect, in the second step a virtual preceding vehicle is set at the stop position of the preceding vehicle and deceleration control and stop hold control with respect to the virtual preceding vehicle are carried out.

Further, according to an eighth aspect, in addition to the seventh aspect, in the second step the setting of the virtual preceding vehicle is released after stop hold control with respect to the virtual preceding vehicle is executed.

A start switch Sc of an embodiment corresponds to control start command means of the present invention.

Effects of the Invention

In accordance with the first aspect of the present invention, the preceding vehicle determination means determines, from an object detected by the object detection means, the state of travel of a preceding vehicle that the subject vehicle is following, and when the driver operates the control start command means the following control means carries out following control in which the subject vehicle is subjected to acceleration/deceleration and being held stopped based on the vehicle speed of the subject vehicle and the inter-vehicle distance with respect to the preceding vehicle. Since the following control means determines that stop determination conditions for the subject vehicle are fulfilled when the preceding vehicle determination means detects that the preceding vehicle has stopped, and after the stop determination conditions are fulfilled temporary stop hold control is carried out after the subject vehicle is subjected to deceleration control regardless of whether or not the preceding vehicle has started, if the preceding vehicle has started before the subject vehicle has stopped due to the preceding vehicle having stopped, the subject vehicle is always subjected to temporary stop hold control. Therefore, starting the subject vehicle requires the driver to operate the control start command means, and it is possible to prevent the driver from mistakenly thinking that the subject vehicle has a function of automatically starting while following starting of the preceding vehicle.

Furthermore, in accordance with the second aspect of the present invention, since the following control means determines that stop determination conditions for the subject vehicle are fulfilled when the inter-vehicle distance when the preceding vehicle has stopped is less than a predetermined value and the vehicle speed of the subject vehicle is less than a predetermined value, it is possible to prevent the subject vehicle from automatically stopping unnecessarily if the inter-vehicle distance when the preceding vehicle has stopped is sufficiently large and the driver would be given an uncomfortable sensation if the subject vehicle stopped, or if the vehicle speed of the subject vehicle when the preceding vehicle has stopped is sufficiently large and the driver has the intention of overtaking the preceding vehicle.

Moreover, in accordance with the third aspect of the present invention, since the following control means carries out deceleration control and stop hold control with respect to the virtual preceding vehicle set at the stop position of the preceding vehicle when it determines that the stop determination conditions for the subject vehicle are fulfilled, even if the actual preceding vehicle has already started, the subject vehicle stops while following stopping of the virtual preceding vehicle and does not start until a start operation is carried out by the driver. Therefore it is possible to prevent the driver from mistakenly thinking that the subject vehicle has an automatic start function.

Furthermore, in accordance with the fourth aspect of the present invention, since the following control means releases the setting for the virtual preceding vehicle after stop hold control with respect to the virtual preceding vehicle is executed, following control with respect to the actual preceding vehicle can be carried out thereafter without problems.

Moreover, in accordance with the fifth aspect of the present invention, the state of travel of the preceding vehicle that the subject vehicle is following is determined from information, detected by the object detection means, about an object in the direction of travel of the subject vehicle, and when the starting of following control is commanded acceleration/deceleration control and stop hold control of the subject vehicle are carried out based on the vehicle speed of the subject vehicle and the inter-vehicle distance with respect to the preceding vehicle. Since in the first step if stopping of the preceding vehicle is detected it is determined that stop determination conditions for the subject vehicle are fulfilled, and in the second step after the stop determination conditions are fulfilled temporary stop hold control is carried out after the subject vehicle is subjected to deceleration control regardless of whether or not the preceding vehicle has started, if the preceding vehicle has started before the subject vehicle has stopped due to the preceding vehicle having stopped, the subject vehicle is always subjected to temporary stop hold control. Therefore, starting the subject vehicle requires the driver to operate the control start command means, and it is possible to prevent the driver from mistakenly thinking that the subject vehicle has a function of automatically starting while following starting of the preceding vehicle.

Furthermore, in accordance with the sixth aspect of the present invention, since in the first step it is determined that stop determination conditions for the subject vehicle are fulfilled when the inter-vehicle distance when the preceding vehicle has stopped is less than a predetermined value and the vehicle speed of the subject vehicle is less than a predetermined value, it is possible to prevent the subject vehicle from automatically stopping unnecessarily if the inter-vehicle distance when the preceding vehicle has stopped is sufficiently large and the driver would be given an uncomfortable sensation if the subject vehicle stopped, or if the vehicle speed of the subject vehicle when the preceding vehicle has stopped is sufficiently large and the driver has the intention of overtaking the preceding vehicle.

Moreover, in accordance with the seventh aspect of the present invention, since in the second step deceleration control and stop hold control with respect to the virtual preceding vehicle set at the stop position of the preceding vehicle are carried out when it is determined that the stop determination conditions for the subject vehicle are fulfilled, even if the actual preceding vehicle has already started, the subject vehicle stops while following stopping of the virtual preceding vehicle and does not start until a start operation is carried out by the driver. Therefore it is possible to prevent the driver from mistakenly thinking that the subject vehicle has an automatic start function.

Furthermore, in accordance with the eighth aspect of the present invention, since in the second step the setting for the virtual preceding vehicle is released after stop hold control with respect to the virtual preceding vehicle is executed, following control with respect to the actual preceding vehicle can be carried out thereafter without problems.

BRIEF DESCRIPTION OF DRAWINGS

FIGS. 2(A)-(B) are diagrams for explaining the operation of following control. (first embodiment)

FIG. 3 is a flowchart for explaining the operation of following control. (first embodiment)

EXPLANATION OF REFERENCE NUMERALS AND SYMBOLS

M1 Preceding vehicle determination means
M2 Following control means
Sa Object detection means
Sb Vehicle speed detection means
Sc Start switch (control start command means)
Va Subject vehicle
Vb Preceding vehicle
Vb' Virtual preceding vehicle

BEST MODE FOR CARRYING OUT THE INVENTION

A mode for carrying out the present invention is explained below by reference to FIG. 1 to FIG. 3.

First Embodiment

Figure 1:
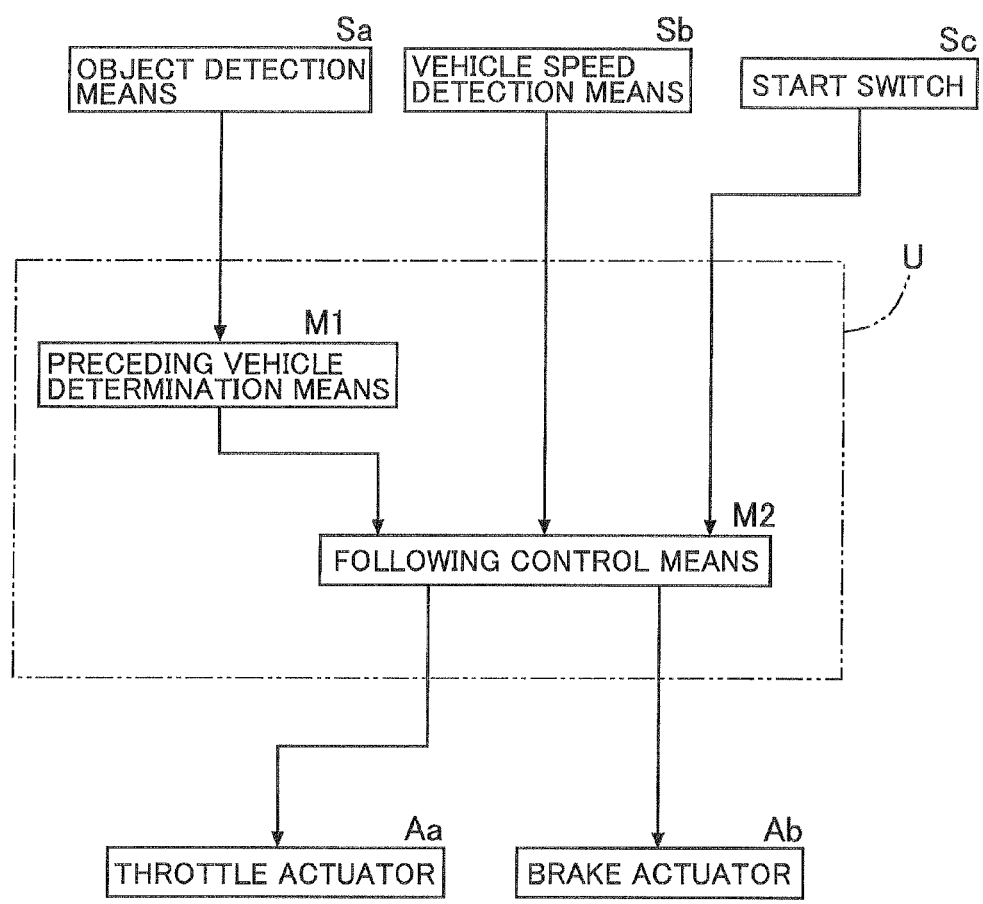
FIG. 1 is a block diagram showing the overall constitution of a car-following controller. (first embodiment)
Figure 4:
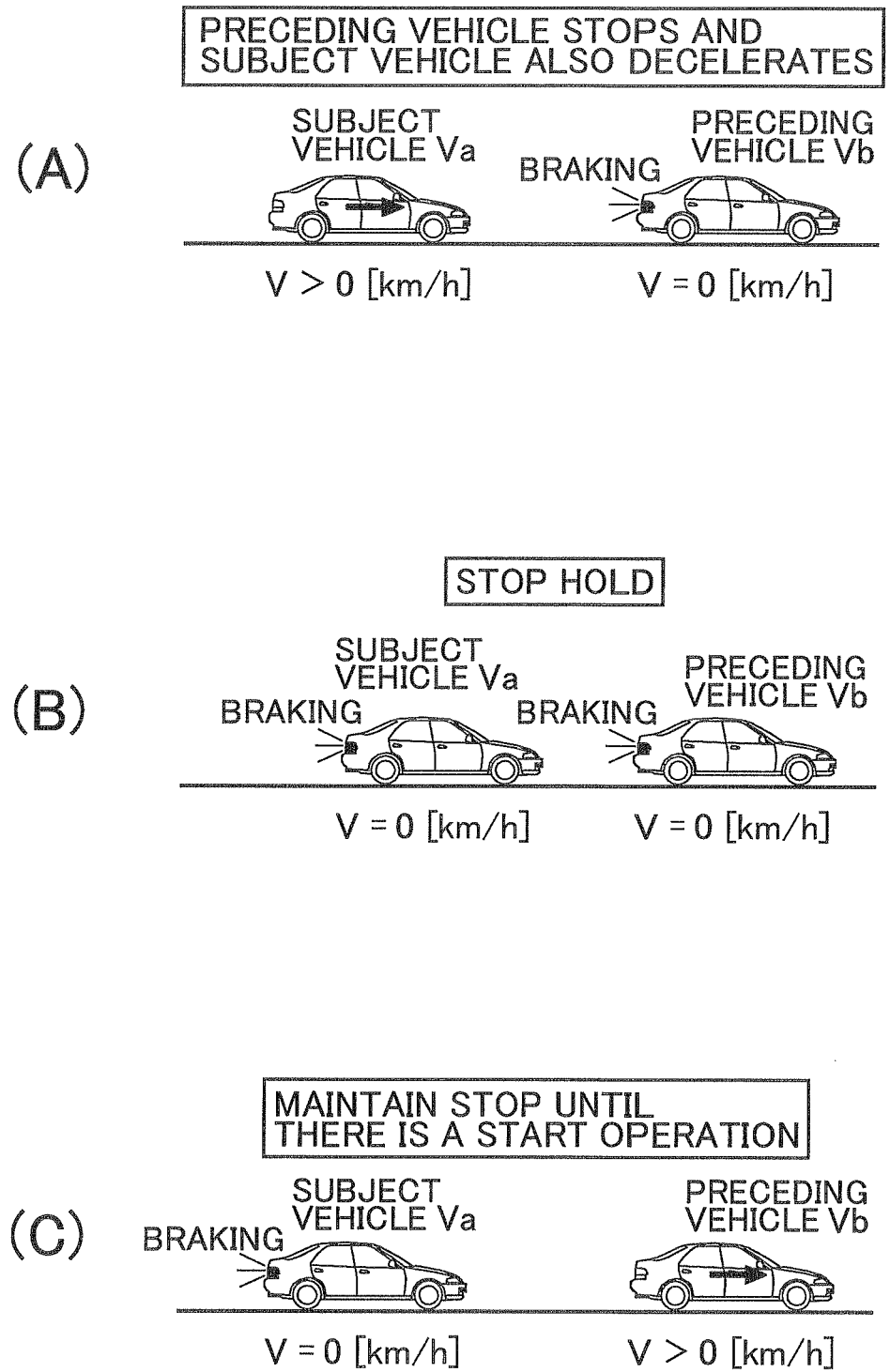
FIG. 4 is a diagram for explaining the operation of a car-following controller in a normal situation. (conventional example)

As shown in FIG. 1, an electronic control unit U of a car-following controller includes preceding vehicle determination means M1 and following control means M2. The preceding vehicle determination means M1 has connected thereto object detection means Sa, which is a radar device for detecting an object such as a preceding vehicle Vb in front of a subject vehicle Va, and the following control means M2 has connected thereto vehicle speed detection means Sb for detecting a vehicle speed of the subject vehicle Va and a start switch Sc that is operated by the driver when starting following control and also has connected thereto a throttle actuator Aa and a brake actuator Ab that automatically accelerate/decelerate and stop the subject vehicle Va in order to make the subject vehicle Va follow the preceding vehicle Vb.

The preceding vehicle determination means M1 determines as a preceding vehicle Vb, among objects detected by the object detection means Sa, an object that is on the course of the subject vehicle Va, has a reflection level that is a predetermined value or greater, and has a relative speed within a predetermined range, and calculates a relative distance thereof (that is, an inter-vehicle distance) and a relative speed.

The following control means M2 controls the operation of the throttle actuator Aa and the brake actuator Ab based on the inter-vehicle distance with respect to the preceding vehicle Vb determined by the preceding vehicle determination means M1, the vehicle speed of the subject vehicle Va detected by the vehicle speed detection means Sb, and operation of the start switch Sc by the driver, in order to make the subject vehicle Va follow the preceding vehicle Vb while maintaining a predetermined inter-vehicle distance. In addition, if the subject vehicle Va stops during following control, following control is temporarily terminated at that point, and following control is not restarted unless the driver carries out an ON operation for the start switch Sc. The reason therefor is to prevent the subject vehicle Va from automatically starting while following the starting of the preceding vehicle Vb when it is necessary for the subject vehicle Va to maintain a stopped state in order to secure safety at an intersection, level crossing, etc. even if the preceding vehicle Vb starts.

Figure 5:
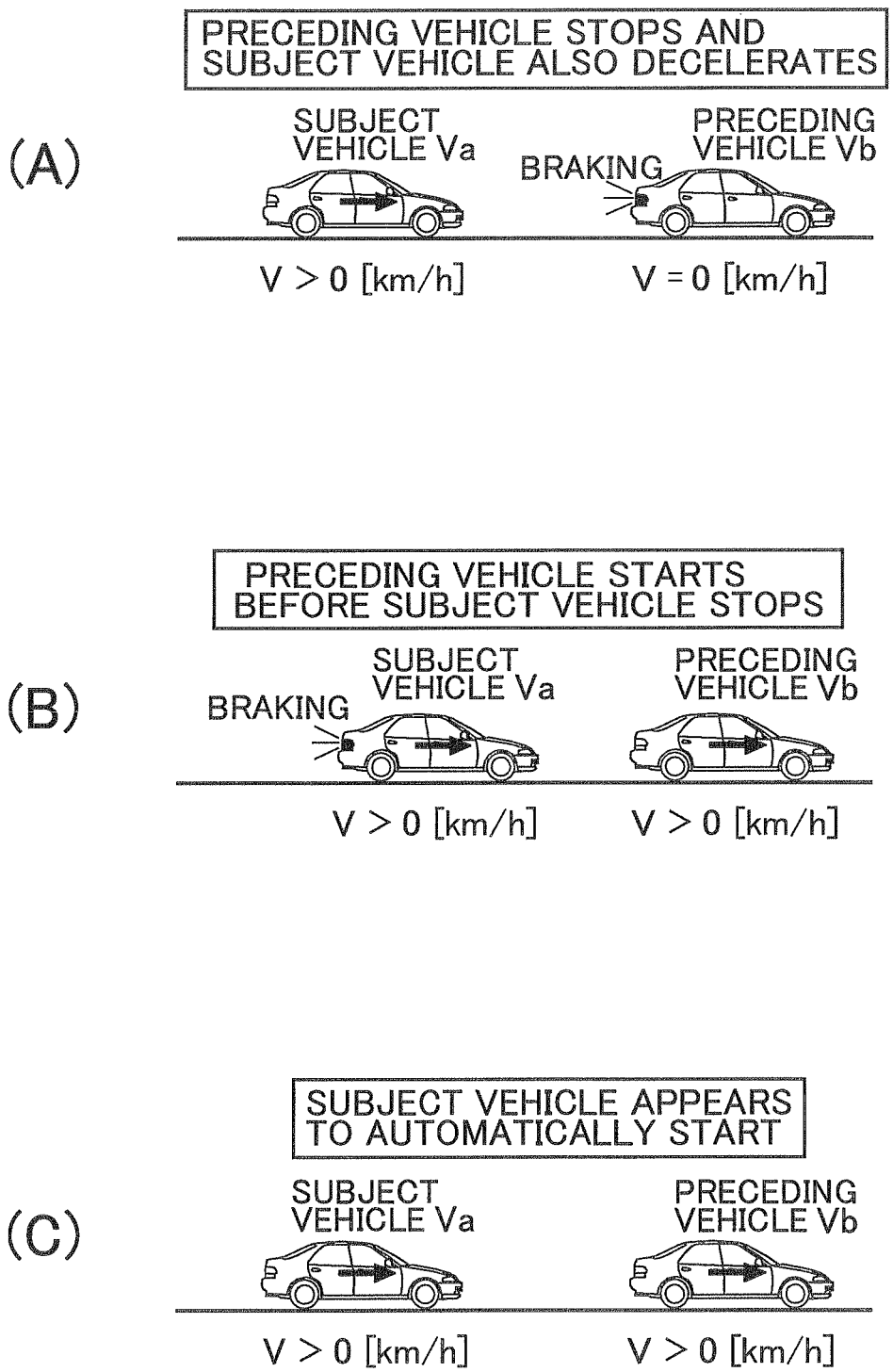
FIG. 5 is a diagram for explaining the operation of the car-following controller in a specific situation. (conventional example)

As already described by reference to FIG. 5, in a conventional car-following controller, if a preceding vehicle Vb starts before a subject vehicle Va decelerates and stops while following the preceding vehicle Vb that has decelerated and stopped, the subject vehicle Va during deceleration accelerates, without stopping, while following the preceding vehicle Vb, and the driver might mistakenly think that the subject vehicle Va has a function of automatically starting.

In order to eliminate such a problem, in the present embodiment control as shown in FIG. 2 is carried out. That is, as shown in FIG. 2 (A), when the subject vehicle Va decelerates while following the preceding vehicle Vb that has stopped, a virtual preceding vehicle Vb' is set at a position where the preceding vehicle Vb has stopped, and the position of the virtual preceding vehicle Vb' is stored. As shown in FIG. 2 (B), even if the preceding vehicle Vb has started before the subject vehicle Va has stopped, since the subject vehicle Va recognizes that the preceding vehicle Vb is stopped at the position of the virtual preceding vehicle Vb', it stops temporarily while following the virtual preceding vehicle Vb' that has stopped. Therefore, it is necessary for the driver to carry out an ON operation for the start switch Sc in order to start the subject vehicle Va, and it is possible to prevent the driver from mistakenly thinking that the subject vehicle Va has an automatic start function.

The above-mentioned operation is explained in further detail by reference to the flowchart of FIG. 3.

First, when in step S1 the preceding vehicle Vb is stopped, the inter-vehicle distance with respect to the preceding vehicle Vb is less than a predetermined value (12 m in the embodiment), and the vehicle speed of the subject vehicle Va is less than a predetermined value (10 km/h in the embodiment), in step S2 a virtual preceding vehicle flag is set at 1 (the virtual preceding vehicle Vb' being present), and in step S3 a current inter-vehicle distance to the virtual preceding vehicle Vb' is stored as a provisional inter-vehicle distance.

On the other hand, if the answer to step S1 above is NO, that is, when the preceding vehicle Vb is not stopped, the inter-vehicle distance with respect to the preceding vehicle Vb is not less than a predetermined value, or the vehicle speed of the subject vehicle Va is not less than a predetermined value, if in step S4 the driver carries out an ON operation for the start switch Sc in order to start following control, the subject vehicle Va is stopped by the following control, or the driver turns OFF the following controller, since setting of the virtual preceding vehicle Vb' is unnecessary, the virtual preceding vehicle flag is reset to 0 (the virtual preceding vehicle Vb' being not present).

If in the subsequent step S6 the setting of the virtual preceding vehicle flag is 1, in step S7 the sign of the vehicle speed of the subject vehicle Va detected by the vehicle speed detection means Sb is reversed and the value is defined as a provisional relative speed with respect to the virtual preceding vehicle Vb', and in step S8 a provisional inter-vehicle distance with respect to the virtual preceding vehicle Vb' is calculated from $$\text{provisional inter-vehicle distance} \leftarrow \text{provisional inter-vehicle distance} + \text{provisional relative speed} \times 0.1 \text{ (sec)}.$$

Here, 0.1 (sec) is a sampling time with which the object detection means Sa detects an object. In step S9 the inter-vehicle distance and the relative speed with respect to the preceding vehicle Vb are replaced by the provisional inter-vehicle distance and the provisional relative speed with respect to the virtual preceding vehicle Vb', and following control is executed thereafter while considering the virtual preceding vehicle Vb' as a preceding vehicle Vb.

As hereinbefore described, in accordance with the present embodiment, it is determined that stop determination conditions for the subject vehicle Va are fulfilled if the inter-vehicle distance when the preceding vehicle Sb has stopped is less than 12 m and the vehicle speed of the subject vehicle Va is less than 10 km/h, and after the stop determination conditions are fulfilled temporary stop hold control is carried out after the subject vehicle Va is subjected to deceleration control regardless of whether or not the preceding vehicle Vb has started. Therefore, if the preceding vehicle Vb starts before the subject vehicle Va stops while following the preceding vehicle Vb that has stopped, the subject vehicle Va is always subjected to temporary stop hold control. This requires the driver to operate the start switch Sc in order for the subject vehicle Va to start, and it is possible to prevent the driver from mistakenly thinking that the subject vehicle Va has a function of automatically starting while following the starting of the preceding vehicle Vb.

Furthermore, since stop determination conditions for the subject vehicle Va include the inter-vehicle distance when the preceding vehicle Vb has stopped being less than 12 m and the vehicle speed of the subject vehicle Va when the preceding vehicle Vb has stopped being less than 10 km/h, it is possible to prevent the subject vehicle Va from automatically stopping unnecessarily if the inter-vehicle distance when the preceding vehicle has stopped is sufficiently large and the driver would be given an uncomfortable sensation if the subject vehicle stopped, or if the vehicle speed of the subject vehicle Va when the preceding vehicle Vb has stopped is sufficiently large and the driver has the intention of overtaking the preceding vehicle Vb.

An embodiment of the present invention is explained above, but the present invention may be modified in a variety of ways as long as the modifications do not depart from the spirit and scope thereof.

For example, the control start command means of the present invention is not limited to the start switch Sc of the embodiment, and may be a sensor that detects depression of an accelerator pedal by a driver.

The invention claimed is:

1. A car-following controller comprising
    object detection device (Sa) for detecting an object in the direction of travel of a subject vehicle (Va),
    vehicle speed detection device (Sb) for detecting a vehicle speed of the subject vehicle (Va),
    control start command device (Sc) for commanding the starting of following control,
    preceding vehicle determination device (M1) for determining the state of travel, among objects detected by the object detection device (Sa), of a preceding vehicle (Vb) that the subject vehicle (Va) is following, and
    following control device (M2) for carrying out acceleration/deceleration control and stop hold control of the subject vehicle (Va) based on the vehicle speed of the subject vehicle (Va) and the inter-vehicle distance with respect to the preceding vehicle (Vb) when starting of following control is commanded by the control start command device (Sc),
    characterized in that the following control device (M2) determines that stop determination conditions for the subject vehicle (Va) are fulfilled if the preceding vehicle determination device (M1) detects stopping of the preceding vehicle (Vb) and, after the stop determination conditions are fulfilled, carries out temporary stop hold control after the subject vehicle (Va) is subjected to deceleration control regardless of whether or not the preceding vehicle (Vb) has started.

2. The car-following controller according to claim 1, wherein the following control device (M2) determines that stop determination conditions for the subject vehicle (Va) are fulfilled if, when the preceding vehicle determination device (M1) detects stopping of the preceding vehicle (Vb), the inter-vehicle distance with respect to the preceding vehicle (Vb) is less than a predetermined value and the vehicle speed of the subject vehicle (Va) is less than a predetermined value.

3. The car-following controller according to claim 1 or claim 2, wherein if stop determination conditions for the subject vehicle (Va) are fulfilled, the following control device (M2) sets a virtual preceding vehicle (Vb') at the stop position of the preceding vehicle (Vb) and carries out deceleration control and stop hold control with respect to the virtual preceding vehicle (Vb').

4. The car-following controller according to claim 3, wherein the following control device (M2) releases the setting of the virtual preceding vehicle (Vb') after stop hold control with respect to the virtual preceding vehicle (Vb') is executed.

5. A car-following control method in which the state of travel of a preceding vehicle (Vb) that a subject vehicle (Va) is following is determined from information about an object, in the direction of travel of the subject vehicle (Va), detected by object detection device (Sa), and acceleration/deceleration control and stop hold control of the subject vehicle (Va) are carried out based on a vehicle speed of the subject vehicle (Va) and an inter-vehicle distance with respect to the preceding vehicle (Vb) when the starting of following control is commanded, characterized in that the method comprises a first step of determining that stop determination conditions for the subject vehicle (Va) are fulfilled if stopping of the preceding vehicle (Vb) is detected, and a second step of, after the stop determination conditions are fulfilled, carrying out temporary stop hold control after the subject vehicle (Va) is subjected to deceleration control regardless of whether or not the preceding vehicle (Vb) has started.

6. The car-following control method according to claim 5, wherein it is determined that stop determination conditions for the subject vehicle (Va) are fulfilled if in the first step the inter-vehicle distance with respect to the preceding vehicle (Vb) when the preceding vehicle (Vb) has stopped is less than a predetermined value and the vehicle speed of the subject vehicle (Va) is less than a predetermined value.

7. The car-following control method according to claim 5 or claim 6, wherein in the second step a virtual preceding vehicle (Vb') is set at the stop position of the preceding vehicle (Vb) and deceleration control and stop hold control with respect to the virtual preceding vehicle (Vb') are carried out.

8. The car-following control method according to claim 7, wherein in the second step the setting of the virtual preceding vehicle (Vb') is released after stop hold control with respect to the virtual preceding vehicle (Vb') is executed.

* * * * *